United States Patent [19]

Obenreder

[11] 3,792,930

[45] Feb. 19, 1974

[54] SYSTEM FOR DETERMINING THE NATURE OF OPTICAL DISTORTION IN GLASS

[75] Inventor: Robert J. Obenreder, Coraopolis, Pa.

[73] Assignee: PPG Industries, Inc., Pittsburgh, Pa.

[22] Filed: May 31, 1973

[21] Appl. No.: 365,787

[52] U.S. Cl.................. 356/209, 356/120, 356/128, 356/239
[51] Int. Cl. ........................................... G01n 21/32
[58] Field of Search ..... 356/120, 128, 209; 250/237

[56] References Cited
UNITED STATES PATENTS
2,429,066  10/1947  Kuehni........................... 356/128 X

*Primary Examiner*—Ronald L. Wibert
*Assistant Examiner*—Matthew W. Koren
*Attorney, Agent, or Firm*—Russell A. Eberly

[57] ABSTRACT

Disclosed is an optical system for determining whether optical distortion of a piece of flat glass is due to index of refraction variations or contours in major surfaces of the glass. A total optical power profile of the glass and a surface contour profile for each major surface of the piece of glass are made. The total optical power profile shows the optical distortion of the glass along a scan path due to contours in each major surface and index of refraction variations. The surface contour profile shows optical distortion of the piece of glass along the scan path due to contours in the surface of the glass. The surface contour profile for each of the surfaces are summed and the sum subtracted from the total optical power profile to determine an internal distortion profile which shows optical distortion of the glass along the scan path due to index of refraction variations.

12 Claims, 7 Drawing Figures

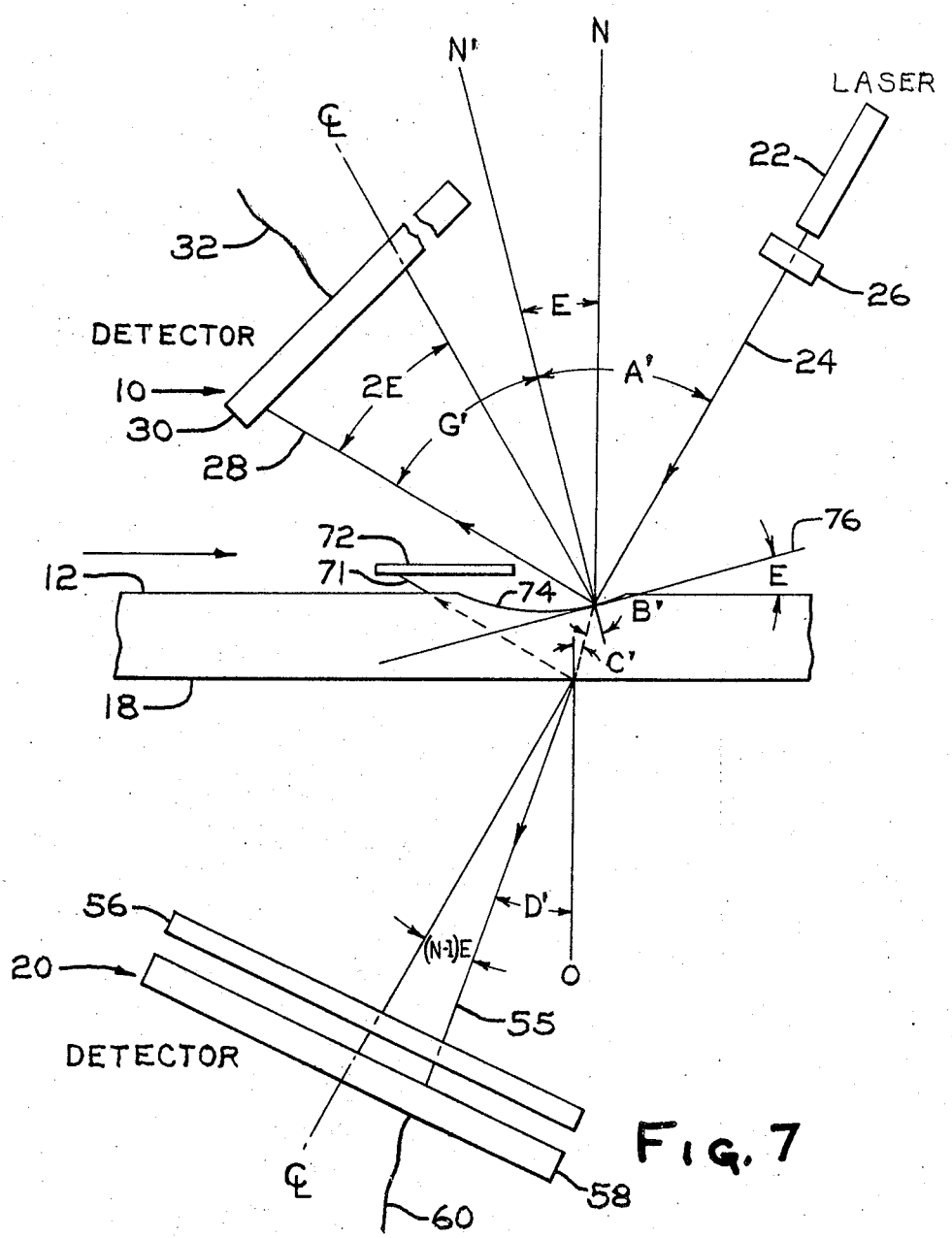

A SYSTEM FOR DETERMINING THE NATURE OF OPTICAL DISTORTION IN GLASS

CROSS REFERENCE TO RELATED APPLICATIONS

The surface distortion analyzer disclosed in U. S. Patent Application Ser. No. 322,574, filed on Jan. 10, 1973, in the name of R. J. Obenreder and entitled "Surface Distortion Analyzer" may be used as a component in the optical system used to practice the invention and is hereby incorporated by reference.

BACKGROUND OF THE INVENTION

1. Field of the Invention

This invention relates to an optical system for determining whether optical distortion, i.e., optical power, of a piece of flat glass is due to index of refraction variations or contours in the major surface of the glass.

2. Discussion of the Prior Art

In the methods of making glass by the known Float, Plate and Sheet Process, defects may be produced in the glass which render the glass optically imperfect. Among the optical imperfections that may be produced are surface distortion and index of refraction variations in the glass. "Surface distortion", as the term is used herein, generally refers to variations in surface flatness, i.e., contours in the surfaces of the glass. "Distortion due to index of refraction variations", as the term is used herein, generally refers to variations in the composition of the glass, such as ream, and defects in the glass, such as bubbles and stones. In general, index of refraction variations deflect light from a predetermined path.

As is well known in the art, surface distortion in glass reflects a distorted image, for example, convex portions shrink the image and concave portions magnify the image. Distortion due to index of refraction variations distort the image transmitted through the glass even when the surfaces are perfectly flat. When excessive distortion due to index of refraction variations or excessive surface distortion are present, they degrade the functional performance of the glass as a window, thereby detracting from the architectural beauty of the glass.

It is desirable to determine if the optical distortion of the glass is due to index of refraction variations or contours in the surface of the glass in order to isolate the problem areas. In general, if the optical distortion of the glass is due to index of refraction variations, the suspect processes are batch preparation, melting or refining. If the optical distortion is due to contours in the surface of the glass, the subject process is forming.

Prior art systems are not sufficiently discriminatory to determine if the optical distortion is due to index of refraction variations or contours in the surfaces of the glass.

SUMMARY OF THE INVENTION

This invention contemplates a method of determining the optical power contribution of index of refraction variations and of surface contours of a piece of glass including the steps of scanning a first surface of a piece of glass to produce a first surface contour profile of the first surface of the glass, wherein the first surface contour profile shows the optical power contribution of the first surface; scanning a second surface of the piece of glass opposite to the first surface to produce a second surface contour profile of the piece of glass, wherein the second surface contour profile shows the optical power contribution of the second surface; adding the surface contour profile of the first and second surface to give a total surface profile; scanning the piece of glass to produce optical power profile, wherein the total optical power profile is the optical power of the glass due to index of refraction variations and contours in the first and second surface; and subtracting the total surface profile from the total optical power profile to determine the optical power contribution of the index of refraction variations in the glass.

BRIEF DESCRIPTION OF THE DRAWING

FIG. 7 is an illustration of a surface distortion analyzer and the total distortion analyzer inspecting a section of the piece of glass having a concave portion in a surface.

DETAILED DESCRIPTION OF THE INVENTION

The total thickness of a piece of glass is considered for purpose of this invention to consist of two thin lenses which are in optical contact at the center plane of the glass. The total optical power would then be equal to the sum of the optical power of the two lenses which are, in the absence of internal index of refraction variations, proportional to the surface curvature or contours at each point. In other words, absent any internal index of refraction variations, the optical distortion of the glass is caused by surface contours of the outer surfaces of the lenses. The above proposition may be illustrated by equation 1 below:

$$P_T = P_{S1} + P_{S2} \qquad 1.$$

where $P_T$ is the total optical power of the thin lenses in optical contact, $P_{S1}$ is the optical power contribution due to the curvature of the outer surface of the first lens, and $P_{S2}$ is the optical power contribution due to the curvature of the outer surface of the second lens.

Glass, however, has index of refraction variations which are caused by varying glass compositions, such as ream, and defects in the glass, such as stones or bubbles. In other words, index of refraction variations cause light to deviate from a predetermined path causing optical distortion even in the absence of contours in the surface. Adding this additional component to equation 1, equation 1 now becomes equation 2 shown below:

$$P_T = P_{S1} + P_{S2} + P_I \qquad 2.$$

where $P_T$, $P_{S1}$ and $P_{S2}$ are as previously defined, and $P_I$ is the internal optical power contribution due to index of refraction variations.

For purposes of this invention, equation 2 may be better written as equation 3:

$$P_I = P_T - (P_{S1} + P_{S2}) \qquad 3.$$

By providing appropriate facilities, which will be discussed, to measure (1) the total optical power of the glass due to surface contour or curvature and to index of refraction variations, (2) the optical power of the first surface due to surface contours in the first surface, and (3) the optical power of the second surface due to surface contours in the second surface which is opposite to the first surface, the internal optical power due to index of refraction variations can be determined.

Figure 1:
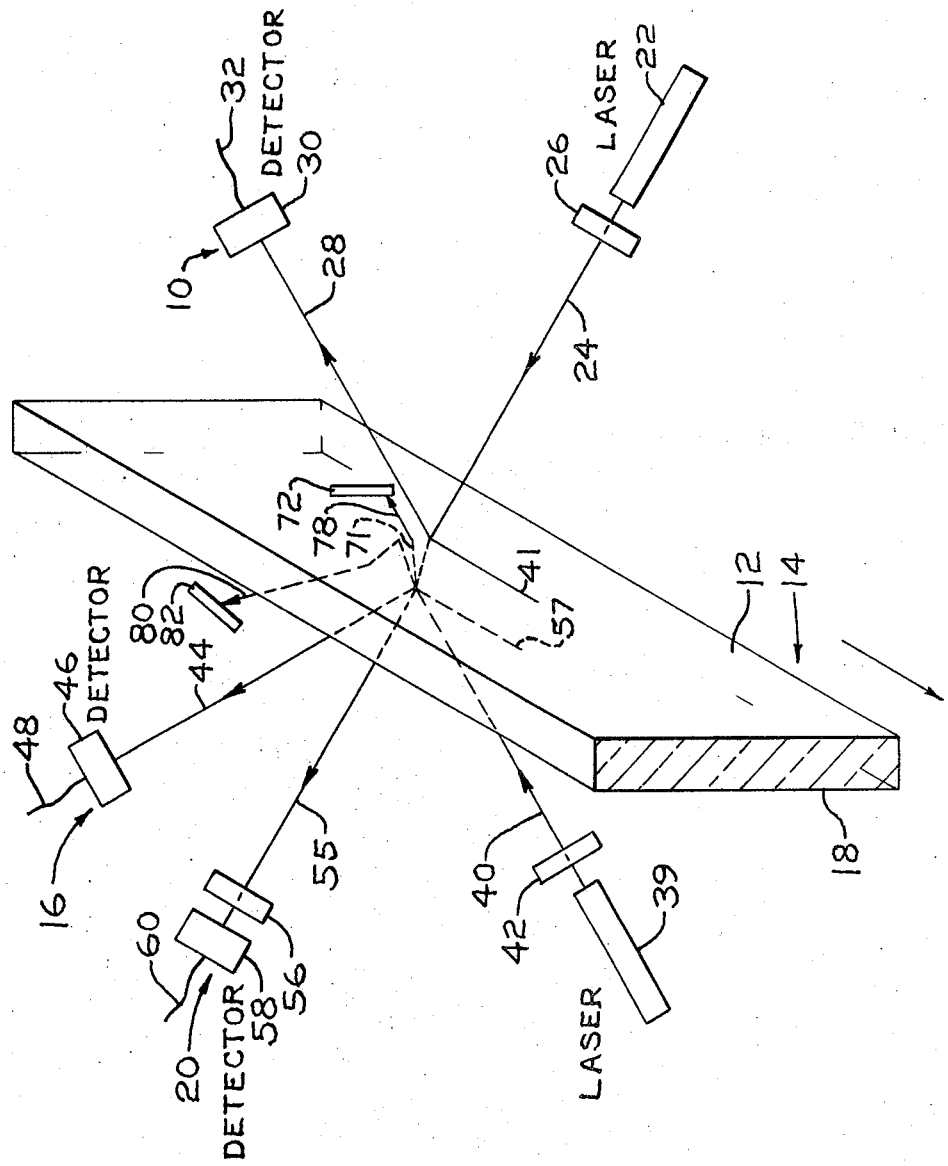
FIG. 1 is an illustration of an optical system for inspecting a piece of glass embodying the principles of the invention.

Referring to FIG. 1, there is illustrated the arrangement of a first surface distortion analyzer 10 mounted adjacent to a first surface 12 of a piece of flat glass 14, a second surface distortion analyzer 16 mounted adjacent a second surface 18 of the piece of glass, and a total distortion analyzer 20 having components mounted on either side of the first and second surfaces of the piece of glass.

In general, the first surface distortion analyzer 10 includes light generating facilities 22, such as a laser, which directs a beam of light 24 through a filter 26 onto the surface 12 at an oblique angle, e.g. 30°, to reflect a beam of light 28 onto a position sensing photo detector 30. Contours in the surface 12 of the glass 14 displace the reflected beam 28 along the surface of the photo detector 30. Signals from the detector 30 are forwarded by way of cable 32 to an electrical system 34 (see FIG. 2) which acts on the signal to generate a surface contour profile 36, 37 or 38 of the surface 12 (see FIGS. 3, 4 and 5). The surface contour profile shows the optical power of the surface 12 due to contours in the surface 12 along a scan path 41. The first surface distortion analyzer 10 lies in a plane perpendicular to the surface 12 and to the scan path 41, as viewed in FIG. 1.

The second surface distortion analyzer 16 generally includes light generating facilities 39, such as a laser, which directs a beam of light 40 through a filter 42 onto the surface 18 at an oblique angle, e.g. 30°, to reflect the beam of light 44 onto a position sensing photo detector 46. Contours in the surface 18 of the glass 14 displace the reflected beam 44 along the surface of the photo detector 46. Signals from the detector 46 are forwarded by way of cable 48 to an electrical system 50 (see FIG. 2) which acts on the signal to generate a surface contour profile 52, 53 or 54 of the surface 18 (see FIGS. 3, 4 and 5). The surface contour profile shows the optical power of the surface 18 due to contours in the surface 18 along a scan path 57 which is parallel to the scan path 41. The second distortion analyzer lies in a plane perpendicular to the surface 18 and parallel to the scan path 57, as viewed in FIG. 1.

In general, the total distortion analyzer 20 includes light generating facilities, such as the laser 22, which directs the beam of light 24 toward the surface 12 of the glass 14. The beam of light exits from the surface 18 as transmitted beam of light 55. The transmitted beam of light 55 passes through a filter 56 and is incident on the surface of a position sensing photo detector 58. Contours in the surfaces 12 and 18 and index of refraction variations displace the transmitted beam 55 along the surface of the photo detector 58. Signals from the photo detector 58 are forwarded by way of cable 60 to an electrical system 61 (see FIG. 2) which acts on the signal to generate a total optical power profile 62, 63 or 64 (see FIGS. 3, 4 and 5) of the piece of glass along the scan paths 41 and 57. The total optical power profile shows optical power of the piece of glass due to contours in the surfaces 12 and 18 and index of refraction variations of the piece of glass 14 along the scan paths 41 and 57. By positioning the first and second distortion analyzers 10 and 16 relative to the scan paths 41 and 57, respectively, as previously discussed, the reflected beam 44 of the second distortion analyzer does not interfere with the transmitted beam of the total distortion analyzer 20.

As can be appreciated by those skilled in the art, the total distortion analyzer may be associated with a separate light source, but for economic considerations, the laser 22 may be used to generate a beam of light used for the first surface distortion analyzer 10 and the total surface distortion analyzer 20.

In a manner to be discussed more fully below, the surface contour profiles 36, 37, 38 and 52, 53, 54 are summed to give a total surface profile 65, 66 and 67, respectively (see FIGS. 3, 4 and 5). The total surface profile 65, 66 and 67 is then subtracted from the total optical power profile 62, 63 and 64 to give an internal distortion profile 68, 69, 70, respectively, (see FIGS. 3, 4 and 5) which shows optical distortion of the glass due to index of refraction variations. In this manner, the optical distortion, i.e., optical power, of the piece of glass due to index of refraction variations, contours in the surface 12 and contours in the surface 18 may be determined.

With reference to FIG. 1, the polarizing filters 26, 42 and 56 are used to control the level of intensity of light on the position sensing photo detectors 30, 46 and 58, respectively. The position sensing photo detectors 30, 46 and 58 may be of any well known type such as Model PIN SC/10 manufactured by United Detector Technology.

The intensity of light on the photo detectors 30, 46 and 58 are maintained above a minimum level, e.g. 80 microwatts, and adjusted to compensate for (1) the oblique incidence of the beams of light 24 and 40 on the surfaces 12 and 18, respectively, and (2) the different planes in which the beams of light 24 and 40 lie so that the contour profiles of surfaces 12 and 18 can be directly summed to give a total surface profile and the total surface profile subtracted from the total optical power profile to give the internal distortion profile. More particularly, the first surface distortion analyzer 10 lies in a plane perpendicular to the surface 12 and the scan path 41 to direct the beam of light 24 at an oblique angle of incidence, e.g. 30°, to the surface 12 and the second surface distortion analyzer 16 lies in a plane perpendicular to the surface 18 and parallel to the scan path 57 to direct the beam of light 40 at an oblique angle of incidence, e.g. 30°, to the surface 18.

The detectors 30, 46 and 58 are adjusted as follows. The output signal of each of the detectors is set to an initial value of voltage versus position, e.g. 50 volts per inch. Thereafter with the beams of light 28, 40 and 55 incident on the detectors 30, 46 and 58, respectively, the filters 26, 42 and 56, respectively, are adjusted to a percent of the initial value selected to compensate for (1) the oblique incidence of the beams of light 24 and 40 on the surfaces 12 and 18, and (2) the different planes in which the beams of light 24 and 40 lie. With the parameters in our example, the filter 26 is adjusted so that the output of the detector 30 is 114 percent of the initial value, i.e., 57 volts per inch, the filter 42 is adjacent so that the output of the detector 46 is 86 percent of the initial value, i.e., 43 volts per inch, and the filter 56 is adjusted so that the output of the detector is 91 percent of the initial value, i.e., 45.5 volts per inch.

In the following discussion, the piece of glass will be displaced relative to the surface distortion analyzers and the total distortion analyzer to scan the piece of glass. However, as can be appreciated, the invention is not limited thereto. The surface distortion analyzers and total distortion analyzer may be synchronously displaced relative to the glass.

TOTAL DISTORTION ANALYZER

Figure 6:
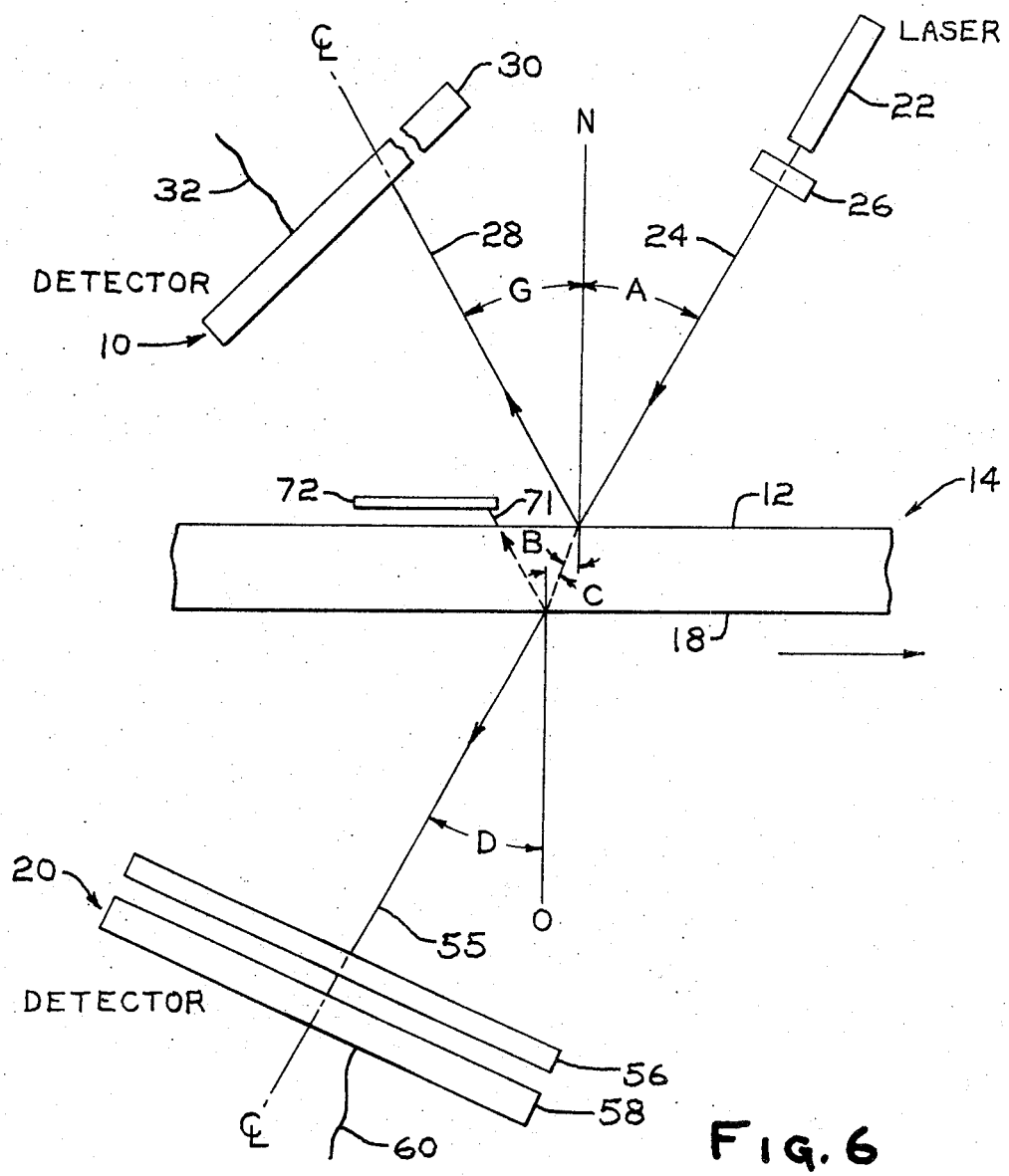
FIG. 6 is an illustrative view of a surface distortion analyzer and a total distortion analyzer inspecting a section of the piece of glass.

With reference to FIGS. 1 and 6, the discussion will now be directed to the operation of the total distortion analyzer 20. The light source 22, such as a continuous laser or a tungsten halogen filament lamp, having lenses to focus the beam of light 24 directs the beam of light 24 through the filter 26 toward the piece of glass 14 along the scan path 41. The beam of light 24 is incident on the surface 12 generally as a point and (1) transmits the beam of light 55 through the glass along the scan path 57 toward the detector 58, (2) reflects the beam of light 28 from the surface 12 toward the detector 30, and (3) reflects secondary beams of light 71 from the second surface 18 through the first surface 12 onto an opaque member 72. The reflected beam 28 and the secondary reflected beams 71 will be discussed in further detail with the first surface distortion analyzer 10. Although the beams of light are shown as single straight lines, it can be appreciated that the beams diverge and converge. However, the photo detectors 30, 46 and 58 are sensitive to the centroid of the light beam and therefore the light beams are shown as single lines.

With specific reference to FIG. 6, the transmitted beam of light 55 passes through the filter 56 and is incident on the center of the photo detector 58. If the index of refraction of the piece of glass is uniform and there are no surface contours in the surfaces 12 or 18 of the piece of glass 14, the transmitted beam of light 55 is continuously incident on the center portion of the photo detector 58 as the piece of glass is displaced from left to right as viewed in FIG. 6. If the beam of light is transmitted through a surface contour in either of the surfaces or if the index of refraction changes, the transmitted beam of light 55 will be incident on the position photo detector 58 at a point other than the center.

Consider the following. As shown in FIG. 6, the piece of glass 14 for purposes of discussion is shown free of contours in the surfaces 12 and 18 and free of index of refraction variations. The beam of light 24 is incident on the surface 12 at an angle A to a line N normal to the surface 12. The beam of light 24 passes through the glass 14 at an angle B to the normal N and exits from the glass at an angle C to a line O normal to the second surface 18 of the piece of glass at the point where the transmitted beam 55 exits from the surface 18.

The transmitted beam 55 has an angle D with the normal O and is incident on the center of the photo detector 58. If there is no index of refraction variation, no curvature in the surfaces and the surfaces are generally parallel, the angle B is equal to the angle C and the normals O and N are parallel to one another. Therefore, the angle A would be equal to the angle D. If the piece of glass has index of refraction variations and the other parameters remain constant, the angle B would not be equal to the angle C but would vary as the index of refraction varies. More particularly, as the piece of glass is displaced from left to right as viewed in FIG. 6, and the index of refraction increases, the angle B for purposes of the discussion remains fixed at the point of entry of the beam of light 24 and the angle C increases due to index of refraction gradients making the angle D greater than the angle A. The transmitted beam would therefore be displaced to the left of the center of the detector 58 as viewed in FIG. 6. If the index of refraction decreases as the piece of glass is displaced from left to right as viewed in FIG. 6, the angle B for purposes of the discussion remains fixed at the point of entry of the beam of light 24 and the angle C decreases due to index of refraction gradients, thereby decreasing the angle D. The transmitted beam 55 would now be displaced to the right of the center of the photo detector 58 as viewed in FIG. 6.

Referring now to FIG. 7, the discussion will be directed to the effect of contours in the surfaces 12 and 18 on the transmitted beam 55. For simplicity of discussion, a concave portion 74 is shown in the surface 12. The surface 18 is free of surface curvature and the piece of glass shown has no index of refraction variations.

The beam of light 24 is incident on a wall of the concave portion 74 sloping downward from right to left as viewed in FIG. 7. A plane 76 is tangent to the point of incidence of the beam of light 24 on the sloping wall of the concave portion 74. The plane 76 is rotated counterclockwise as viewed in FIG. 7 from the surface 12 by an angle E. The angle of incidence A' to the line N' normal to the plane 76 is greater than the angle A by an amount equal to the rotation of the plane 76, i.e., angle E. For small angles, the angle B' is now greater than the angle B by the quantity E/N; angle C' is less than angle C by an amount equal to (N-1/N)XE where E is the angle of rotation of the plane 76 and N is the refractive index of the glass. As can be appreciated, since the angle of rotation of the plane 76, i.e., angle E, is generally less than 1° for most flat glass, the small angle assumption is valid. As shown in FIG. 7, the rotation of the plane 76 has been exaggerated for purposes of clarity.

The transmitted beam 55 exits from the surface 18 at an angle D' to the normal O. The angle D' is less than the angle D by an amount equal to (N−1) E. The transmitted beam 55 now strikes to the right of the center of the detector 58. The displacement of the beam 55 from the center of the photo detector 58 is equal to (N−1) E times the spacing between the detector 58 and the surface 18 of the piece of glass.

As can be appreciated, rotating the plane 76 clockwise as viewed in FIG. 7, i.e., when the beam of light 24 is incident on a wall of the concave portion 74 sloping downward from left to right, the transmitted beam of light 55 would strike to the left of the center of the detector. Although the discussion was directed to contours in the surface 12, it can be appreciated by those skilled in the art that the discussion is also applicable to contours in the surface 18. The discussion of the present invention thus far has been directed to the effect of index of refraction variations and of contours in the surfaces of the piece of glass on the transmitted beam. However, as can be appreciated by those skilled in the art, the displacement of the transmitted beam along the surface of the detector 58 from the center thereof indicates index of refraction variation in the piece of glass and/or surface contours in the surfaces 12 and 18 of the piece of glass. With reference to equation 3, the total distortion analyzer gives the optical distortion due to index of refraction variation and/or contours in the surfaces, i.e., $P_T$. To determine internal optical distortion of the glass, i.e., $P_I$, it is therefore necessary to determine the optical distortion due to contours in the surface 12, i.e., $P_{S1}$ and in the surface 18, i.e., $P_{S2}$.

Contours in the surface 12 and 18 are determined using the surface distortion analyzers 10 and 16, respectively (see FIG. 1).

SURFACE DISTORTION ANALYZERS

Referring to FIG. 1, the laser 22 of the surface distortion analyzer 10 directs the beam of light 24 onto the surface 12 along the scan path 41 generally as a point to (1) transmit the beam of light 55 toward the detector 58, (2) reflect the beam of light 28 toward the detector 30 from the surface 12, and (3) reflect the secondary beam of light 71 from the second surface 18 through the first surface onto the opaque member 72. The laser 39 of the surface distortion analyzer 16 directs the beam of light 40 onto the surface 18 along the scan path 57 generally as a point to (1) transmit a beam of light 78 through the glass toward the opaque member 72, (2) reflect the beam of light 44 from the surface 18 toward the detector 46, and (3) reflect secondary beams of light 80 from the first surface 12 through the second surface 18 onto an opaque member 82.

The opaque member 72 shields the detector 30 from the secondary beam 71 and transmitted beam 78. The opaque member 82 shields the detector 46 from the secondary beam 80. As can be appreciated, the transmitted beam from the laser 39 is blocked by the opaque member 72 because only one total distortion analyzer is being employed. For ease of shielding the detectors 30 and 46 from the secondary beams and the transmitted beam while not interfering with the reflected beams 28 and 44 and transmitted beam 55, it is recommended that the glass thicknesses of greater than 3/32 inch, the angle of incidence of each of the surface distortion analyzers be approximately between 0° and 30° and for glass thicknesses of less than 3/32 inch, the angle of incidence be approximately greater than 30°, for example, 30° to 45°. It has been found that an angle of incidence of 30° gives satisfactory performance for glass thickness down to 1/16 inch.

The laser 22 and position photo detector 30 are spaced a predetermined distance from each other which is equal to the distance between the laser 39 and photo detector 46. The distance between the surface distortion analyzer 10 and the surface 12; between the surface distortion analyzer 16 and the surface 18; and the photo detector 58 and the surface 18 are equal. Although not required to practice the invention, it will become readily apparent that maintaining this arrangement facilitates the practice of the invention.

Referring to FIG. 1, it is preferred that the beam of light 40 from the laser 39 be incident on the surface 18 at the point where the transmitted beam 55 exit from the surface 18. As will be appreciated, the invention is not limited thereto, but in providing such an arrangement, the surface contour profiles generated by the surface distortion analyzers 10 and 16 and total optical power profile generated by the total distortion analyzer 20 may be easily compared point for point along the scan path.

The surface distortion analyzers 10 and 16 function in a similar manner, therefore, only one surface distortion analyzer, namely, surface distortion analyzer 10, will be discussed with the understanding that the discussion is applicable to the other surface distortion analyzer.

With reference to FIG. 6, the beam of light 24 is incident on the surface 12 of the piece of glass to reflect a beam of light 28 onto the center of the surface of the position photo detector 30. The angle of incidence A is equal to the angle of reflection G. As previously mentioned, the transmitted beam 55, as shown in FIG. 6, is incident on the center of the photo detector 58. If the surfaces 12 and 18 of the piece of glass 14 are free of surface curvature and there is no index of refraction variation, reflected beams 28 and 44 and transmitted beam 55 remain at the center of the photo detectors 32, 46 and 58, respectively (see also FIG. 1). Using equation 3, and considering the displacement of the reflected beams 28 and 44 and the transmitted beam 55 from the center of the photo detectors 32, 46 and 58 as distortion due to surface contours and index of refraction variations, it will be seen that the glass is optically perfect. More particularly, $P_T$, $P_{S1}$ and $P_{S2}$ of equation 3 would be zero.

Consider now that the piece of glass has an index of refraction variation as indicated by the displacement of the transmitted beam 55 from the center of the detector 58. The surfaces 12 and 18 of the piece of glass are flat as indicated by the reflected beams 28 and 44 at the center of the detectors 30 and 46, respectively. Using equation 3, $P_{S1}$ and $P_{S2}$ are zero and $P_I$ would be equal to $P_T$ indicating that the optical distortion of the piece of glass is due to index of refraction variations.

Referring now to FIG. 7 and displacing the glass from left to right as viewed in FIG. 7 moves the concave portion 74 past the beam of light 24. The beam of light 24 is first incident on the wall of the concave portion 74 sloping downward from right to left as viewed in FIG. 7. The plane 76 is tangent to the point of incidence of the beam of light on the sloping wall of the concave portion 74. The plane is rotated counterclockwise as viewed in FIG. 7 from the top surface 12 by an angle E. Maintaining the light source 22 stationary, the angle of incidence becomes A' which is larger than the angle of incidence A by an amount equal to angle E (see also FIG. 6). The angle of reflection G' remains equal to the angle of incidence A'. The total increase between the reflected beam 28 and normal N to the top surface 12 as viewed in FIG. 7 is by an amount equal to an angle 2E (see also FIG. 6). The reflected beam 28 is incident on the surface of the detector 32 to the left of the center line with an angle of displacement equal to two times the angle of rotation and the distance equal to 2E times the distance between the surface 12 and the detector 30.

As was previously discussed, the transmitted beam 55 as shown in FIG. 7 is displaced to the right of the center of the detector 58 by an amount equal to $(N-1)E$ times the distance from the detector 58 to the surface 18. Setting the detectors 30 and 58 and 46 equidistant from the surfaces 12 and 18, respectively, the displacement of the beam 28 from the center of the detector 30 is greater than the displacement of the transmitted beam 55 from the center of the detector 58 by an amount equal to (2/N−1). Therefore, equation 3 for purposes of the present discussion now becomes equation 4:

$$P_I = P_T - [(N-1)/(2) P'_{S_1} + (N-1)/(2) P'_{S_2}] \quad 4.$$

where $P_I$ and $P_T$ are as previously defined, $P'_{S_1}$ is the reflective optical power of the surface 12, $P'_{S_2}$ is the reflective optical power of the surface 18, (N−1/2) is the reducing factor so that the displacement of the transmitted beam from the center of the detector 58 due to surface contours is equal to the displacement of the reflected beams 28 and 44 from the center of the detector 30 and 46 due to contours in the surfaces 12 and 18, respectively, and (N−1/2) $P'_{S_1}$ and (N−1/2) $P'_{S_2}$ are equal to $P_{S_1}$ and $P_{S_2}$, respectively, of equation 3 wherein $P_{S_1}$ and $P_{S_2}$ are as previously defined.

For purposes of the discussion, the surface 18 is free of contours therefore the term (N−1/2) $P'_{S_2}$ is zero. Displacement of the transmitted beam from the center of the detector 58 is (N−1) E times the distance between the detector 58 and the surface 18. The displacement of the reflected beam 28 from the center of the detector 30 is equal to (N−1/2) (2E) times the distance between the detector 30 and the surface 12. Keeping the distance between the detectors 46 and 58 and 30 equidistant from the surfaces 18 and 12, respectively, $P_I$ equals zero. Therefore, the optical distortion of the glass is due to contours in the surface 12.

As the beam of light 24 is incident on the surface of the concave portion 74 sloping downward from left to right as viewed in FIG. 7, the plane 76 would be tangent to the surface at the right of incidence and would now be rotated clockwise from the top surface 12 by an angle E. In this instance, the angle of incidence A (see FIG. 6) would be decreased by an amount equal to angle E. The total decrease between the reflected beam 28 and the normal to the top surface 12 as viewed in FIG. 7 would be 2E. The reflected beam 28 will strike the detector surface to the right of the center of the detector 30. Similarly, the transmitted beam 55 would be displaced to the left of the photo detector 30 by an amount equal to (N−1) E.

In the practice of the invention, the piece of glass 14 is analyzed to determine if optical distortion is due to surface contours or index of refraction variations. By using equation 4, it is now possible to determine if the optical distortion is due to surface contours or index of refraction variation.

By observing the position of the reflected beams 28 and 44 and transmitted beam 55 on the surface of the detectors 30, 46 and 58, respectively, and moving the glass 14 at a constant speed, a surface contour profile of the surfaces 12 and 18 and a total optical power profile of the glass can be made.

As can be appreciated, maintaining the detector and light source of each surface distortion analyzing system at a predetermined distance with relationship to each other and a surface of the piece of glass, any displacement of the piece of glass toward or away from the light source and detector would displace the reflected beam to the right or to the left, respectively, of the center of the respective detector as viewed in FIG. 6. By positioning a surface distortion analyzer on each side of the surfaces 12 and 18, displacement of the glass ribbon toward or away from one surface analyzer would be cancelled by the displacement of the glass ribbon away from or toward, respectively, the second surface analyzer. Consider the following example, the surface contour profile of the surface 12 shows displacement of the reflected beam due to non-flatness of the top surface and displacement of the surface 12 toward the analyzer 10. The surface contour profile of the surface 18 shows displacement of reflected beam due to non-flatness of the surface 18 and displacement of the surface 18 away from the analyzer 16. Adding the two profiles together would cancel out displacement of the glass ribbon and give a total surface profile for the surfaces 12 and 18 showing optical distortion of the surfaces 12 and 18, respectively, of the piece of glass 14. As can be appreciated by those skilled in the art, displacement of the glass toward or away from the detector 58 does not affect the position of the transmitted beam 55 on the surface of the detector 58. This feature of the invention makes it adaptable as an on-line inspection system.

In the instance where it is desired to use this system as an off-line inspection system, the piece of glass may be mounted in a workholder of the type disclosed in the above-mentioned U. S. Pat. Application Ser. No. 322,574.

Although not required but recommended, the reflected and transmitted beams of light 28, 44 and 54, respectively, should be isolated from the surrounding room light. This may be accomplished by directing the beams of light 38, 44 and 54 through tubes such as those disclosed in the above-mentioned U. S. Pat. Application Ser. No. 322,574 to prevent stray room light from affecting the photo detectors.

ELECTRONIC SYSTEM

Figure 2:
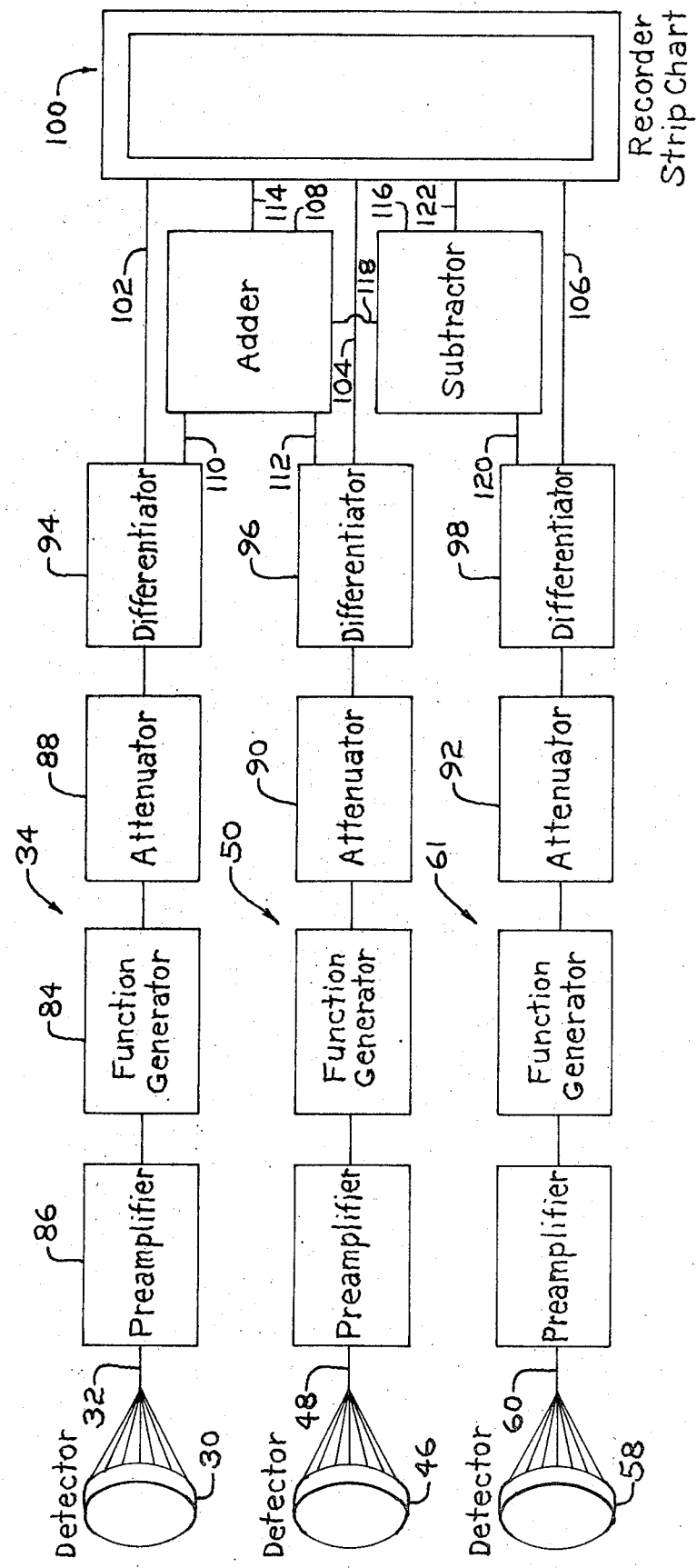
FIG. 2 is a block diagram of an electrical system that may be used in the practice of the invention operating on signals from the optical system.

Referring to FIG. 2, there is shown a block diagram of the electronic systems 34, 50 and 61 that may be used to convert the signal from the position sensing photo detectors 30, 46 and 58, respectively. The systems 34, 50 and 61 are similar in construction and operation and therefore the discussion will be directed to the system 34 and the discussion is applicable to the systems 50 and 61 unless otherwise indicated.

The signal from the detector 30 is too weak for linearization in a function generator 84 such as a Model 1662/16–2 manufactured by Burr Brown Instrumentation and is therefore forwarded to a preamplifier 86 such as a Model 3061/16 manufactured by Burr Brown Instrumentation. The signal received from the position sensing photo detector 30 by way of the cable 32 indicates the position of the reflected beam 28 on the surface of the detector, i.e., voltage output as a function of position of the reflected beam on the detector surface. The amplified signal is thereafter forwarded to the function generator 84 which operates on the amplified input signal to linearize the position voltage relationship with the amplified detector signal. The amplified linearized output signal from the function generator is forwarded to an attenuator 88.

The attenuators 88 and 90 of the systems 34 and 50, respectively, associated with the surface distortion analyzers 10 and 16, respectively, reduces the amplified linearized signal by a factor of (N−1/8). Attenuator 92 of the system 61 associated with the total distortion analyzer 20 attenuates the signal by a factor of a fourth. In this manner, the difference between the displacement of the transmitted beam 55 due to surface contours and the reflected beams 28 and 44 due to surface contours are compensated (see equation 4).

The reduced signal from the attenuator 88, 90 and 92 is forwarded to a differentiator 94, 96 and 98, respectively, for example, a differentiator constructed around an operational amplifier such as a Burr Brown Model 3293/14 which differentiates the signal with respect to time, more particularly, rate of change of voltage with respect to time. Moving the glass at a constant speed, time can be related to position of the beams of light 28 and 44, 55 along the scan paths 41 and 57, respectively. An output signal from the differentiator 94, 96 and 98 of the systems 34, 50 and 61, respectively, is forwarded to a strip chart voltage recorder 100 by way of cables 102, 104 and 106, respectively. The output signals from the differentiators 94, 96 and 98 operate on the strip chart recorder 100 to plot the surface contour profile 36, 37 or 38 for the surface 12, the surface contour profile 52, 53 or 54 for the surface 18 and the total optical power profile 62, 63 or 64 for the piece of glass 14, respectively (see FIGS. 3, 4 or 5).

A similar signal as that forwarded to the strip chart recorder 100, such as a 6 channel brush strip chart recorder, is forwarded from the differentiators 94 and 96 to an adder-subtractor 108 such as a Bell and Howell Model 19–301A by way of cables 110 and 112, respectively. The signals for the same point on the scan path are summed and forwarded to the strip chart recorder 100 by way of cable 114 and to an adder 116 by way of cable 118. The recorder plots a total surface profile 65, 66 or 67 which is the addition of the surface contour profiles 36 and 52, 37 and 53, or 38 and 54, respectively (see FIGS. 3, 4 or 5).

The signal from the differentiator 98 of the system 61 is forwarded to the adder-subtractor 116 by way of the cable 120, and the adder subtracts the summed signal from the adder 108 from the signal from the differentiator 98. The signal is forwarded by way of cable 122 to the recorder 100 to display the internal distortion profile 68, 69 or 70 (see FIGS. 3, 4 or 5) which is distortion of the glass due to index of refraction variation. As can be appreciated, by providing the attenuators 88, 90 and 92 with different reduction factors, the surface deviation of the reflected beam due to surface contours are adjusted so that the subtraction of the surface contour profiles from the total optical power profile indicates the optical distortion of the glass due to index of refraction variation as shown by the internal distortion profile.

Position sensing photo detectors which may be used to practice the method of this invention are of the type that indicate the position of a beam of light on the detector surface as a function of voltage. When the beam of light is incident on the center of the detector, a reference voltage, i.e., zero, is recorded. Beams of light incident on one side of center are represented by a negative voltage and beams of light incident on the opposite side of center are represented by a positive voltage. As the beam of light is displaced from the center of the detector, the voltage increases positively or negatively depending on the direction of beam displacement. The voltage signal from the detectors 30, 46 and 58 is operated on by the system 34, 50 and 61, respectively, to forward a signal to the strip chart recorder, adder 108 and subtractor 116 that is rate of change of voltage with respect to time. By displacing the piece of glass at a set constant speed, time is related to position along the scan paths 41 and 57.

Figure 3:
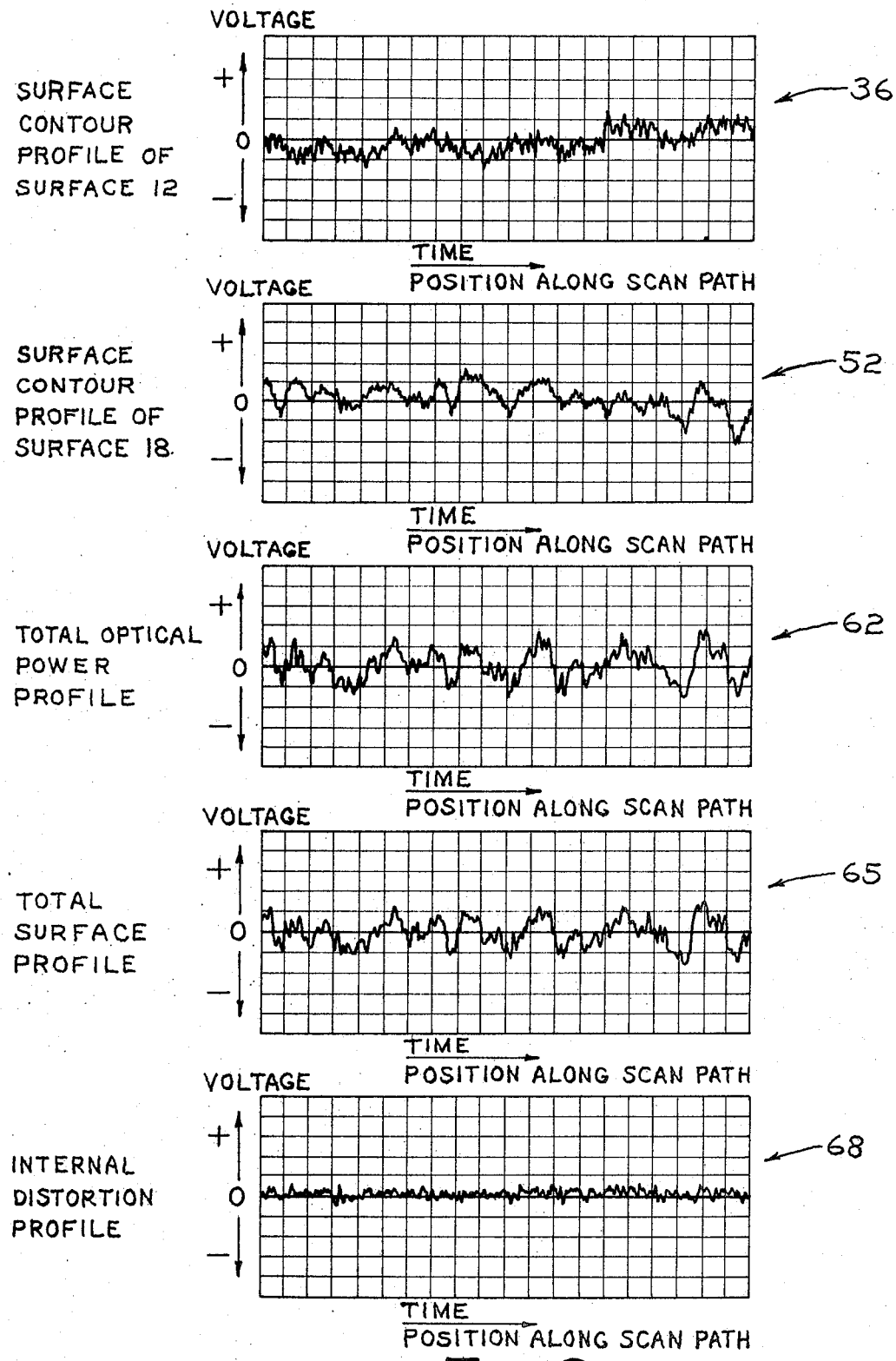
FIGS. 3, 4 and 5 are pictorial illustrations of a strip chart illustrating a surface contour profile for each surface of a piece of glass, a total optical power profile for the piece of glass, a total surface profile which is the sum of the surface contour profiles and an internal distortion profile for the piece of glass.
Figure 4:
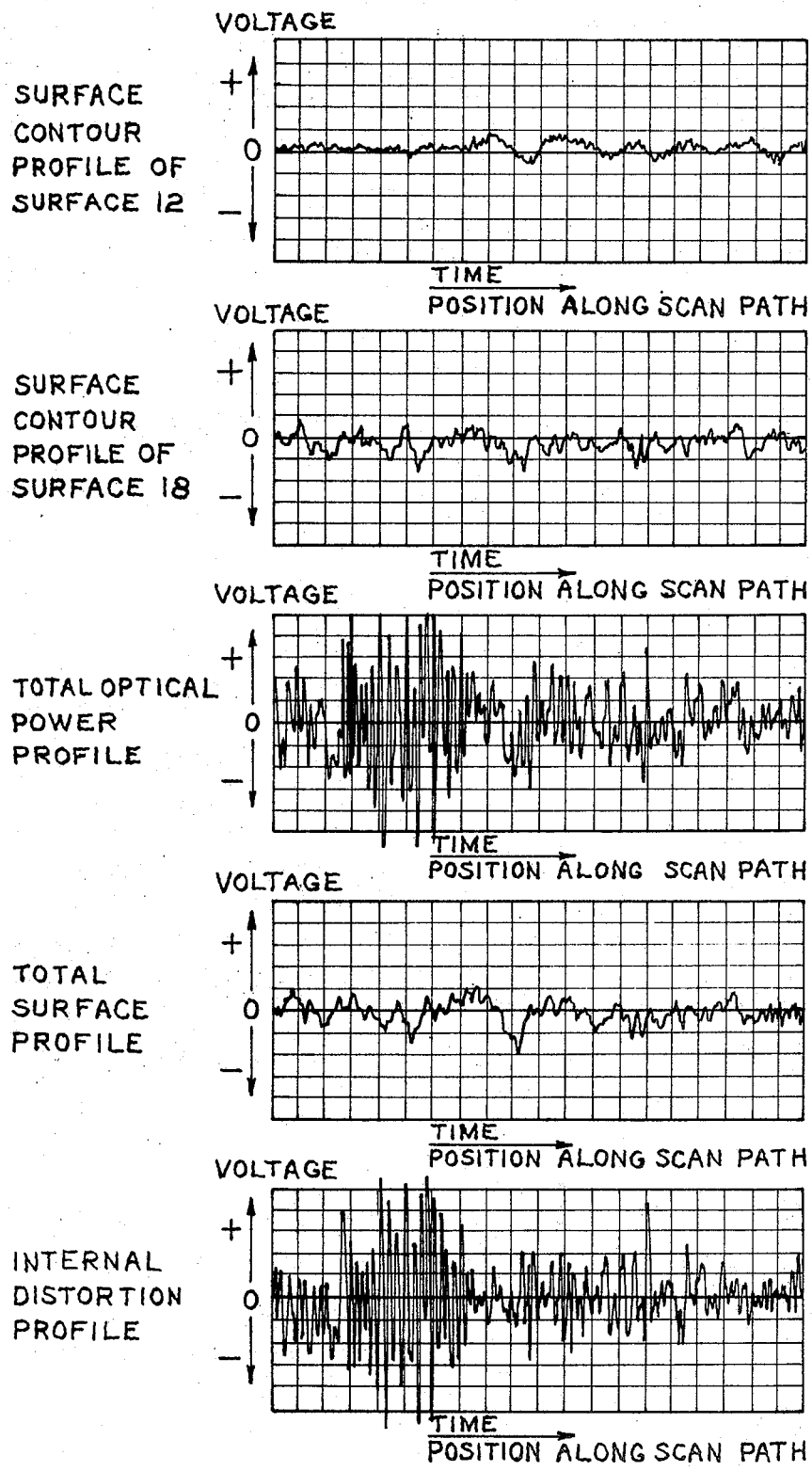
Figure 5:
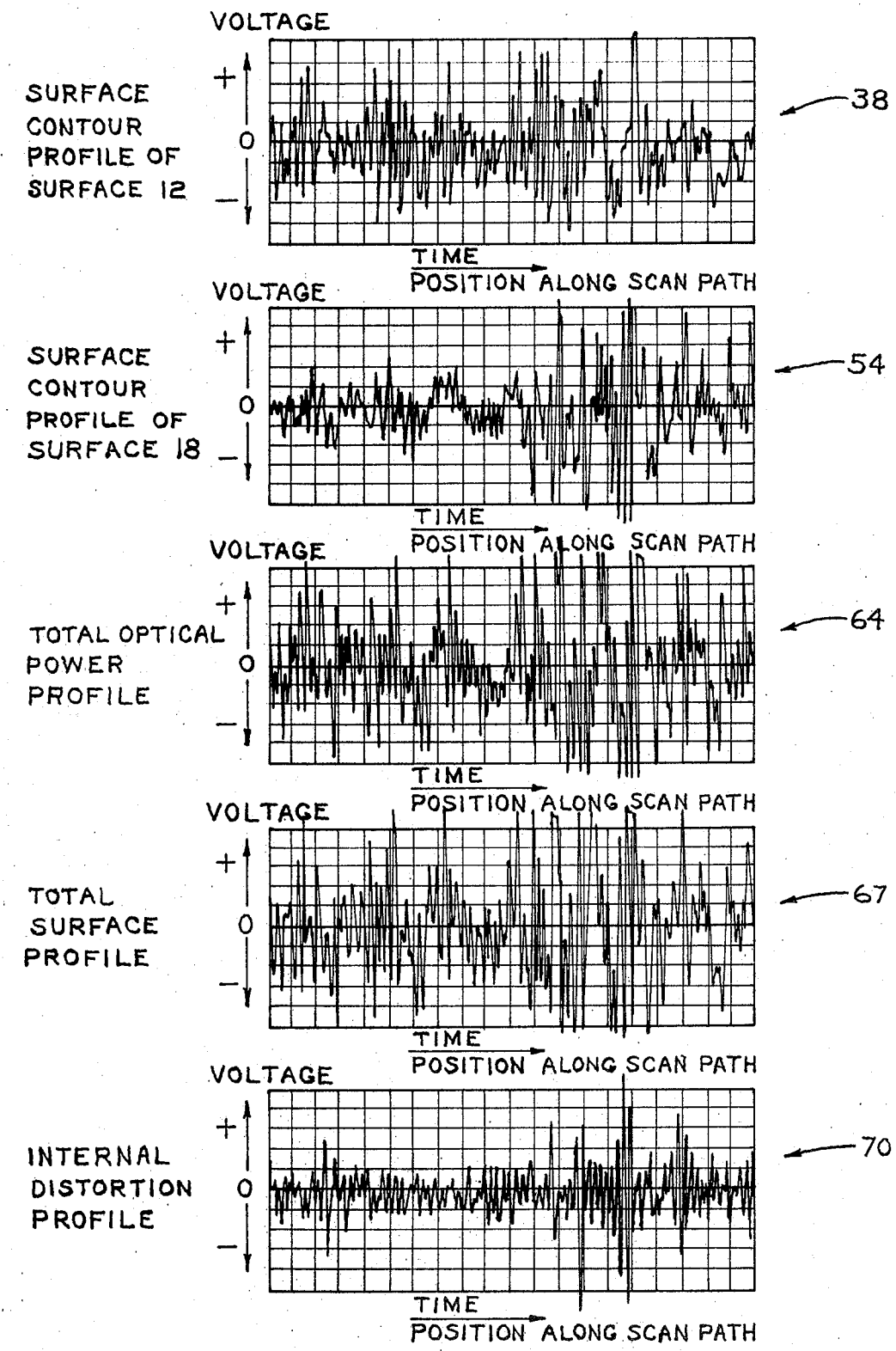

Referring now to FIGS. 3, 4 and 5, the surface contour profiles 36, 37, 38 and 52, 53, 54 show concave and convex portions for the surfaces 12 and 18, respectively. As can be appreciated, deviation from flatness may be shown as a sinusoidal curve and the convex portion indicated by the first half of the sine wave, i.e., a positive voltage, and concave portions indicated by the second half of the sine wave, i.e., negative voltage. The amplitude of the curvature across a span is shown by the change in voltage with respect to time.

The total optical power profiles 62, 63 and 64 show concave and convex portions for the surfaces 12 and 18 and index of refraction variations in the glass 14. As can be appreciated, since the profiles 62, 63 amd 64 show displacement of the transmitted beam 55 from the center of the detector 58 due to contours in the surfaces 12 and 18 and to index of refraction variations in the glass, the total optical power profile does not follow any set curve pattern.

The total surface profile 65, 66 and 67 is the algebraic sum of surface contour profiles 36, 37, 38 and 52, 53, 54, respectively.

The internal distortion profiles 68, 69 and 70 show the optical power of the glass due to index of refraction variations as variations in plotted voltage.

Referring to FIG. 3, there is shown a portion of a strip chart showing a section of a piece of flat glass having optical distortion as shown by the total optical profile 62. Comparing the surface contour profiles 36 and 52 to the internal distortion profile 68, it can be seen that the contours in the surfaces of the glass contributed more to the optical distortion of the glass than the index of refraction variation. Therefore, the process apparently requiring investigation in the forming process.

Referring to FIG. 4, there is shown a portion of a strip chart showing a section of a piece of glass having optical distortion as shown by the total optical power profile 63. Comparing the surface contour profiles 37 and 53 to the internal distortion profile 69, it can be seen that the index of refraction variations contribute more to the optical distortion of the glass than contours in the surfaces of the glass. Therefore, the processes apparently requiring investigation are the batch preparation, melting or refining processes.

Referring to FIG. 5, there is shown a portion of a strip chart showing a section of a piece of glass having optical distortion as shown by the total optical profile 64. Comparing the surface contour profiles 38 and 54 to the internal distortion profile 70, it can be seen that index of refraction variations and contour in the surfaces of the glass both contribute to the optical distortion of the glass. Therefore, the processes of batch preparation, melting, refining and forming apparently require investigation.

By practicing the method of the invention, flat glass can now be analyzed to show optical distortion due to contours in the surfaces 12 and 18 and optical distortion due to index of refraction variation caused by either compositional variations such as ream or defects such as stones or blisters.

As can be appreciated, certain modifications can be made to the apparatus without deviating from the scope of the invention. More particularly, the electrical components and their relationship to one another is only illustrative of one of many that may be used. Further, the invention was discussed using particular types of surface distortion analyzer and total distortion analyzer, but the invention is not limited thereto.

What is claimed is:

1. A method of determining optical power contribution of index of refraction variations and of curvatures in surfaces of a piece of glass comprising the steps of:
scanning a first surface of the piece of glass to produce a first surface contour profile wherein the first surface contour profile shows optical power contribution of the first surface;
scanning a second surface of the piece of glass to produce a second surface contour profile wherein the second surface contour profile shows optical power contribution of the second surface which is opposite to the first surface;
adding the first and second surface contour profiles to give a total surface profile;
scanning the piece of glass to produce an optical power profile of the glass wherein the optical power profile is the optical power of the glass due to index of refraction variations and contour in the first and second surface; and
subtracting the total surface profile from the optical power profile to determine the optical power contribution of index of refraction variations in the glass.

2. The method as set forth in claim 1 wherein said step of scanning to produce a first surface contour profile includes the steps of:
directing a beam of light toward the piece of glass to reflect a beam from the first surface and from the second surface through the first surface;
providing relative motion between the piece of glass and the beam of light to reflect the beam of light from the first surface along a scan path onto position sensing means;
shielding the sensing means from the beam of light reflected from the second surface through the first surface; and
observing relative positions of the reflected beam of light on the sensing means caused by surface contours in the first surface.

3. The method as set forth in claim 2 wherein the relative motion between the piece of glass and the beam of light is at a constant speed and including the steps of:
observing relative positions of the reflected beam of light as a function of time; and
computing surface flatness of the first surface as a function of position on the article.

4. The method as set forth in claim 1 wherein the step of determining the optical power profile includes the steps of:
transmitting a beam of light through the glass article onto position sensing means;
providing relative motion between the glass article and the beam of light; and
observing relative position of the beam of light on the position sensing means caused by index of refraction variations and contours in the first and second surface of the piece of glass.

5. The method as set forth in claim 1 including the steps of:
directing a first beam of light toward the first surface of the glass article to reflect a beam of light from the first surface, from the second surface back through the first surface and transmit a beam of light through the piece of glass;
reflecting the beam of light from the first surface onto a first position sensing means;
shielding the beam of light reflected from the second surface back through the first surface from the first position sensing means;
impinging the transmitted beam of light onto a second position sensing means;
directing a second beam of light toward the second surface of the piece of glass to reflect a beam of light from the second surface and from the first surface back through the second surface;
reflecting the beam of light from the second surface onto a third position sensing means;
shielding the beam of light reflected from the first surface back through the second surface from the second and third position sensing means;
displacing the glass article relative to the first and second beam of light; and
observing relative position of the reflected beam of light from the first surface on the first position sensing means, caused by surface contours in the first surface, of the transmitted beam of light on the second position sensing means caused by surface contours in the first and second surface and index of refraction variations in the glass, and of the reflected beam of light from the second surface on the third position sensing means caused by surface contours of the second surface.

6. The method as set forth in claim 5 including the step of:
computing a first surface contour profile, a second surface contour profile, and an optical power profile.

7. The method as set forth in claim 1 wherein said scanning steps are performed simultaneously.

8. An apparatus for determining optical power contribution of index of refraction and of curvatures in surfaces of a piece of glass comprising:
means for determining surface contour profile of a first surface of the piece of glass wherein the surface contour profile of the first surface shows optical power contribution of the first surface;
means for determining surface contour profile of a second surface of the piece of glass opposite to the first surface wherein the surface contour profile of the second surface shows optical power contribution of the second surface;
means for determining optical power profile of the piece of glass wherein the optical power profile is the optical power of the piece of glass due to index of refraction variations and contour in the first and second surface of the piece of glass; and
means responsive to said first, second and third determining means for determining the optical power contribution of index of refraction variations.

9. The apparatus as set forth in claim 8 wherein said first determining means includes:
means for directing a beam of light onto the first surface;

means for imparting relative motion between said directing means and the glass to reflect the beam of light from the first surface;

means for observing changes in relative positions of the reflected beam of light from the first surface caused by contours in the first surface.

10. The apparatus as set forth in claim 8 wherein said third determining means includes:

position sensing means;

means for directing a beam of light through the glass onto said position sensing means;

means for imparting relative motion between said directing means and the glass; and means for observing changes in relative positions of the beam of light transmitted through the glass caused by contours in the first and second surfaces of the glass and by index of refraction variations in the glass.

11. The apparatus as set forth in claim 8 wherein:

said first determining means includes:

a first position sensing means;

a first means for directing a beam of light toward the piece of glass to reflect a beam of light from the first surface onto said first position sensing means, to reflect a beam of light from the second surface through the first surface of the piece of glass and to transmit a beam of light through the piece of glass;

a first means for shielding the beam of light reflected from the second surface through the first surface from said first position sensing means; and means acted on by said first position sensing means to generate a first surface contour profile wherein the first surface contour profile shows optical power contribution of the first surface;

said second determining means includes:

a second position sensing means;

a second means for directing a beam of light toward the piece of glass to reflect a beam of light from the second surface onto said second position sensing means, to reflect a beam of light from the first surface through the second surface of the piece of glass and to transmit a beam of light through the piece of glass onto said first shielding means;

second means for shielding the beam of light reflected from the first surface through the second surface from said second position sensing means; and means acted on by said second position sensing means to generate a second surface contour profile wherein the second surface contour profile shows optical power contribution of the second surface; and said third determining means includes:

a third position sensing means mounted in the path of the transmitted beam of said first determining means; and means acted on by said third position sensing means for generating a total optical power profile of the glass wherein said total optical power profile shows optical power contribution of the index of refraction variations and contours in the first and second surfaces of the piece of glass.

12. The apparatus as set forth in claim 11 further including:

means for adding the first and second surface contour profile to produce a total surface contour profile in such a manner that the effect of contours in the first and second surface on said first and second position sensing means, respectively, has the similar effect on said third position sensing means; and means for subtracting the total surface contour profile from the total optical power profile to produce a profile showing optical power of the glass due to index of refraction variations.

* * * * *